United States Patent
Jornod et al.

(10) Patent No.: US 11,751,131 B2
(45) Date of Patent: Sep. 5, 2023

(54) VEHICLE, NETWORK NODE, APPARATUS, COMPUTER PROGRAM, AND METHOD FOR SELECTING A MOBILE COMMUNICATIONS SYSTEM FOR A MOBILE COMMUNICATIONS SERVICE

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 155 days.

(21) Appl. No.: 17/531,432

(22) Filed: Nov. 19, 2021

(65) Prior Publication Data
US 2022/0167261 A1 May 26, 2022

(30) Foreign Application Priority Data
Nov. 24, 2020 (EP) .................................. 20209653

(51) Int. Cl.
*H04W 28/02* (2009.01)
*H04W 48/18* (2009.01)

(52) U.S. Cl.
CPC ....... *H04W 48/18* (2013.01); *H04W 28/0268* (2013.01)

(58) Field of Classification Search
CPC ... H04W 48/18; H04W 28/0268; H04W 4/24; H04W 4/44; H04W 4/40; H04M 15/80; H04M 15/8016; H04M 15/49
(Continued)

(56) References Cited

U.S. PATENT DOCUMENTS

| 2016/0105821 A1* | 4/2016 | Senarath .......... H04W 28/24 370/329 |
|---|---|---|
| 2019/0090181 A1 | 3/2019 | Iyer et al. |
| 2020/0045559 A1 | 2/2020 | Kim et al. |

FOREIGN PATENT DOCUMENTS

| EP | 3614770 A1 | 2/2020 |
|---|---|---|
| EP | 3716662 A1 | 9/2020 |

(Continued)

OTHER PUBLICATIONS

Hetzer et al.; 5G Connected and Automated Driving: Use Cases and Technologies in Cross-border Environments; 2019 European Conference on Networks and Communications (EUCNC); IEEE; Jun. 18, 2019; pp. 78-82.
(Continued)

*Primary Examiner* — Huy C Ho
(74) *Attorney, Agent, or Firm* — BARNES & THORNBURG, LLP

(57) ABSTRACT

A transportation vehicle, a network node, an apparatus, a computer program, and a method for selecting a mobile communications system for a mobile communications service. The method includes obtaining for each of multiple mobile communications services information on a required quality of service (rQoS) of the mobile communications services, determining for each of multiple mobile communications systems information on a predicted quality of service, and selecting from the multiple mobile communications systems a mobile communications system for each of multiple mobile communications services based on the information on the rQoS and the pQoS of the mobile communications system.

25 Claims, 2 Drawing Sheets

(58) Field of Classification Search
USPC .................................................. 455/435.2
See application file for complete search history.

(56) References Cited

FOREIGN PATENT DOCUMENTS

| WO | WO-2019081039 A1 | * | 5/2019 | ......... H04L 41/5009 |
| WO | WO-2019180700 A1 | * | 9/2019 | ............ B60W 30/16 |
| WO | 2020107991 A1 | | 6/2020 | |

OTHER PUBLICATIONS

Fifth Generation Cross-Border Control; a 5G-PPP Phase 3 Innovation Action; downloaded from https://5gcroco.eu; published prior to Nov. 24, 2020.
Search Report for European Patent Application No. 20209653.3; dated May 17, 2021.

* cited by examiner

VEHICLE, NETWORK NODE, APPARATUS, COMPUTER PROGRAM, AND METHOD FOR SELECTING A MOBILE COMMUNICATIONS SYSTEM FOR A MOBILE COMMUNICATIONS SERVICE

PRIORITY CLAIM

This patent application claims priority to European Patent Application No. 20209653.3, filed 24 Nov. 2020, the disclosure of which is incorporated herein by reference in its entirety.

SUMMARY

Illustrative embodiments relate to a transportation vehicle, a network node, an apparatus, a computer program, and a method for selecting a mobile communications system for a mobile communications service. In particular, illustrative embodiments relate to a concept for selecting a mobile communications system for the mobile communications service based on required quality of service of the mobile communications service and a predicted quality of service of the mobile communications system.

BRIEF DESCRIPTION OF THE DRAWINGS

Disclosed embodiments will be described with reference to the accompanying figures, in which.

DETAILED DESCRIPTION

Figure 1:
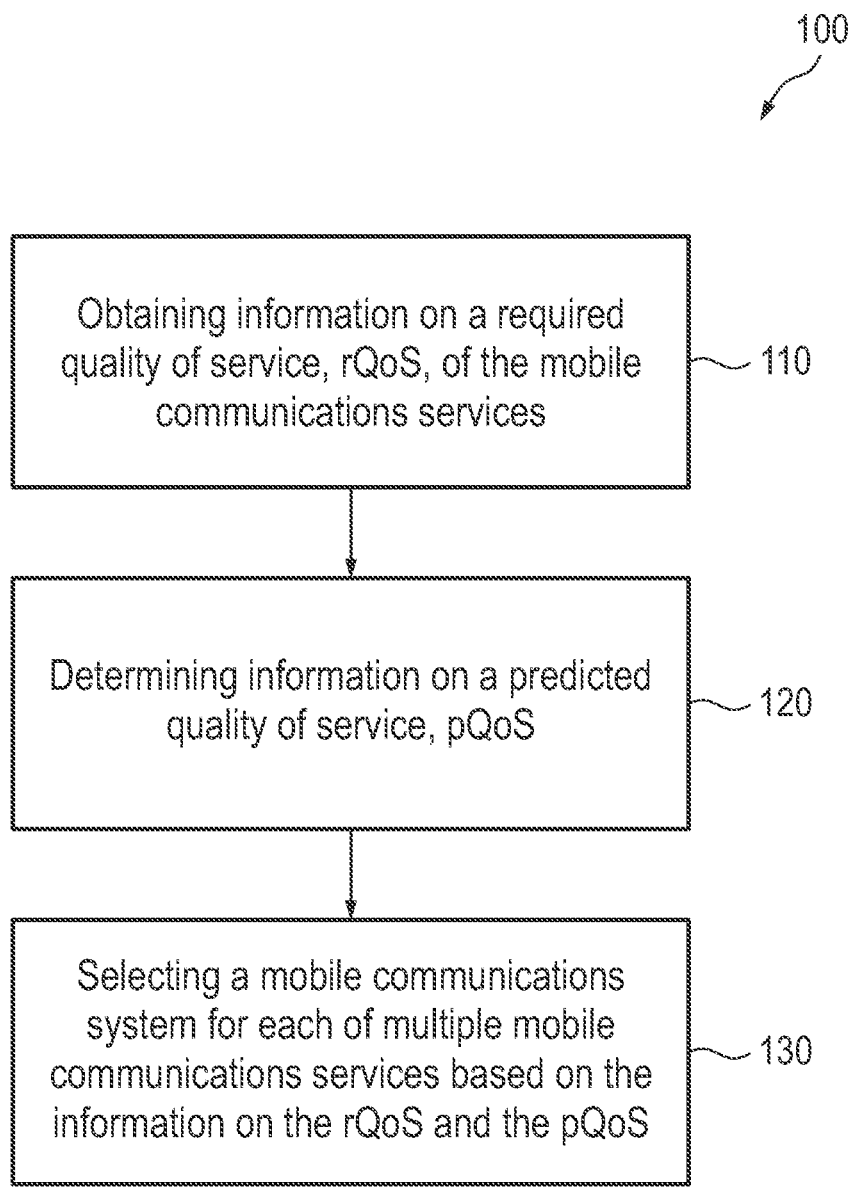
FIG. 1 illustrates a flowchart of an exemplary embodiment of a method for selecting mobile communications systems for multiple mobile communications services of a transportation vehicle.

Vehicular communication plays an increasingly important role in the development of transportation vehicles, and, in particular, in autonomously or semi-autonomously driving transportation vehicles or applications. Autonomous driving applications, e.g., may greatly benefit from vehicle-to-anything (V2X) communication. For some applications, such as platooning, V2X communication enables driving with low inter-vehicle distance and therefore save fuel and improve road efficiency. For other applications, such as tele-operated driving (ToD), V2X communication allows a control center (CC) to remotely take control of an autonomous vehicle (AV) to solve deadlock situations. Other applications are, e.g., high definition (HD) mapping and anticipated cooperative collision avoidance (ACCA). Further information on such applications can be found on https://5gcroco.eu/.

One major challenge of V2X communication is the rapid variation of quality of service (QoS). If the application can only react to changes, it may be severely limited as it may be designed with regard to a worst case scenario for the V2X communication, i.e., a worst possible QoS.

Document US 2020/0 045 559 A1 provides a concept for selecting public land mobile networks (PLMNs) for user equipment (UE) based on requirements on the PLMNs and a predicted QoS. In this concept, the PLMN may not satisfy various different requirements for the QoS for various applications or services. Consequently, a functionality of some applications may be impaired.

Document EP 3 614 770 A1 proposes a method for a managing mobile transceiver assigning radio re-sources to one or more other mobile transceivers in a group of mobile transceivers in a communication environment having two or more radio access technologies (RATs) available. The method comprises obtaining information on desired services and desired qualities of service from the mobile transceivers in the group of mobile transceivers and obtaining information on a quality of service available in the two or more radio access technologies. Further, the meth-od comprises allocating radio resources of at least one of the two or more radio access technologies to the mobile transceivers of the group of mobile transceivers based on the information on the desired services and desired qualities of service and based on the information on the quality of service available.

Document EP 3 716 662 A1 suggests a method for a transportation vehicle. The method comprises transmitting a request to a base station of a mobile communication system. The request relates to a service having a pre-defined Quality of Service (QoS) requirement. The method further comprises receiving a response to the request from the base station. The response indicates that the service is unavailable from the base station at the pre-defined QoS requirement. The response comprises information related to one or more alternatives to the requested service. The method comprises transmitting an updated version of the request. The updated version is based on the one or more alternatives.

Document HETZER DIRK ET AL: "5G Connected and Automated Driving: Use Cases and Technologies in Cross-border Environments", 2019 EUROPEAN CONFERENCE ON NETWORKS AND COMMUNICATIONS (EUCNC), IEEE, 18 Jun. 2019 (2019-06-18), pages 78-82, XP033597248, DOI: 10.1109/EUCNC.2019.8801993 describes a set of key 5G technologies including Mobile Edge Computing/Cloud or Mulli-Access Edge Computing/Cloud (MEC)-Enabled Distributed Computing, predictive QoS, E2E QoS with Network Slicing, Mobile Network-Supported Precise Localization, and Security in context of the so-called "5GCroCo project".

Thus, there may be a demand for an improved concept for selecting mobile communications systems for mobile communications services.

This demand may be satisfied by the subject-matter of the appended independent and dependent claims.

Disclosed embodiments of the present disclosure are based on the finding that several mobile communications services may have different requirements for a QoS of a mobile communications system and, thus, different respective mobile communications systems may be suitable for the mobile communications services. Hence, a basic idea of the present disclosure is to select for different mobile communications services a respective mobile communications system with respect to a required QoS of the different mobile communications services. In particular, the respective mobile communications system may be selected according to whether a predicted QoS of the mobile communications system meets the required QoS. In this way, different mobile communications systems may be selected and used for different mobile communications services with regard to their different requirements on the QoS.

Disclosed embodiments provide a method for selecting mobile communications systems for multiple mobile communications services of a transportation vehicle. The method comprises obtaining for each of multiple mobile communications services information on a required quality of service, rQoS, of the mobile communications services. Further, the method comprises determining for each of multiple mobile communications systems information on a predicted quality of service, pQoS. The method also comprises selecting from the multiple mobile communications systems a mobile communications system for each of multiple mobile communications services based on the information on the rQoS and the pQoS of the mobile communications system. This allows the transportation vehicle to select a suitable mobile communications system for the multiple mobile communications services.

In some disclosed embodiments, the method further comprises obtaining, for the mobile communications systems, information on a utility of multiple mobile communications services for the pQoS of a respective mobile communications system. Further, selecting the mobile communications system may comprise selecting the mobile communications system based on the information on the utility. In this way, the mobile communications system which provides a desired, a required, and/or the highest utility, may be selected.

In some disclosed embodiments, the mobile communications services comprise a mobile communications service for tele-operated driving, ToD, high definition (HD) mapping, anticipated cooperative collision avoidance (ACCA), and/or a mobile communications service for controlling a transportation vehicle in a platoon of transportation vehicles. So, the mobile communications services may comprise either one or more of the aforementioned examples of mobile communications services. A skilled person having benefit from the will appreciate that those mobile communications services may improve a driving behavior of a (autonomously or at least semi-autonomously driving) transportation vehicle and, e.g., improve collision avoidance, an efficiency, and/or a reliability of such transportation vehicles. A skilled person will appreciate that the mobile communications service may additionally or alternatively comprise one or more other mobile communications services, e.g., for other applications of the transportation vehicle.

The information on the utility may comprise information on a maximum allowable velocity of a remotely controlled transportation vehicle in the mobile communications service for ToD, on an attainable map update rate and/or map accuracy in the mobile communications service for HD mapping, on an attainable ACCA prediction horizon in the mobile communications service for ACCA, and/or on a minimum allowable distance of the transportation vehicle to other transportation vehicles in the platoon in the mobile communications service for controlling the transportation vehicle in the platoon ("platooning"). Accordingly, selecting the mobile communications system may comprise selecting the mobile communications system for the mobile communications service for ToD based on the information on the maximum allowable velocity, for the HD mapping based on the attainable map update rate and/or map accuracy, for ACCA based on the attainable ACCA prediction horizon, and/or for the mobile communications service for controlling the transportation vehicle in the platoon based on the minimum allowable distance. Thus, the mobile communications system which may provide a desired, a required, and/or the highest velocity in ToD, map update rate and/or map accuracy in HD mapping, the largest prediction horizon in ACCA, and/or the shortest minimum allowable distance in platooning, may be selected.

In some disclosed embodiments, obtaining from multiple mobile communications systems the information on the pQoS comprises obtaining for the mobile communications systems information on a pQoS of one or more radio access technologies, RATs, of a respective mobile communications system. Accordingly, selecting the mobile communications system may comprise selecting a RAT of the mobile communications system based on the information on the pQoS of the RATs. This allows to select from multiple RATs of a mobile communications system a RAT providing a pQoS corresponding at least the rQoS or the best pQoS among the multiple RATs.

The method may further comprise obtaining, for the multiple mobile communications systems, a confidence of a respective pQoS, and wherein selecting the mobile communications system comprises selecting the mobile communications system for each of multiple mobile communications services based on the confidence. In this way, e.g., it may be achieved that an actual future QoS of the selected mobile communications system actually satisfies the rQoS of a respective mobile communications service with a predefined probability.

In some disclosed embodiments, the method further comprises determining a QoS prediction horizon for the pQoS with respect to a velocity of the transportation vehicle, a traffic situation around the transportation vehicle, and/or an adaption capability of the rQoS one or more of the mobile communications services. Further, determining from the multiple mobile communications systems the pQoS may comprise determining for each of multiple mobile communications systems the pQoS for the QoS prediction horizon. This allows to select the respective mobile communications service sufficiently early, e.g., to maintain the functionality of the mobile communications services, in particular, in case of (future) changes in the QoS of the mobile communications systems, as laid out in more detail later.

Optionally, selecting from the multiple mobile communications systems a mobile communications system for each of multiple mobile communications services comprises selecting for at least two of the mobile communications services different mobile communications systems. So, e.g. a first mobile communications system of the multiple mobile communications systems may be selected for a first mobile communications service and another second mobile communications system of the mobile communications systems may be selected for a second mobile communications service, and/or one or more other mobile communications services. This allows to exploit different mobile communications systems, e.g., to improve utilities of the mobile communications services.

The method may further comprise adjusting the rQoS of one or more mobile communications services based on the information on the pQoS by adjusting a functional setting of the one or more of the mobile communications services. This, e.g., allows to lower the rQoS of one or more mobile communications services while maintaining a desired functionality to enable one or more of the mobile communications systems to meet the lowered rQoS. Also, the settings may be adjusted with an increase in the pQoS to better exploit the selected mobile communications system. Also, the functional setting may be adjusted based on (expected or estimated) costs for the use of the mobile communications systems for the mobile communications services.

In some disclosed embodiments, the method further comprises determining costs for multiple mobile communications systems for the mobile communication services. Further, the method my comprise selecting the mobile communications system for the mobile communications service based on the costs. The skilled person having benefit from the present disclosure will appreciate that thereby costs for the mobile communications services may be saved.

The method may also comprise determining for each of multiple mobile communications systems further information on a predicted quality of service, pQoS for the mobile communication service. Also, the method may comprise selecting from the multiple mobile communications systems a mobile communications system for each of multiple mobile communications services based on the information on the rQoS and the further information on the pQoS of the mobile communications system. The further information on the pQoS, e.g., comprises information on a later pQoS with respect to the other (previously determined) information on the pQoS. This, e.g., allows to proactively change for the mobile communications services the respective (selected) mobile communications system based on the later pQoS.

Further disclosed embodiments provide a computer program having a program code for performing at least one of the methods proposed herein, when the computer program is executed on a computer, a processor, or a programmable hardware component.

Other disclosed embodiments provide an apparatus comprising one or more interfaces for communication and a data processing circuit configured to control the one or more interfaces and to execute one of the methods proposed herein.

Also, disclosed embodiments may provide a network node and/or a transportation vehicle comprising the apparatus proposed herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a flow chart of an exemplary embodiment of a method 100 for selecting mobile communications systems for multiple mobile communications services of a transportation vehicle.

As laid out in more detail below, method 100 may be executed by a network node which may execute method 100 for the transportation vehicle from remote, e.g., to save resources (e.g., processing power) of the transportation vehicle. Also, the transportation vehicle may execute method 100 by itself.

As one can see from the flow chart, method 100 comprises obtaining 110 for each of multiple mobile communications services information on a required quality of service (rQoS) of the mobile communications services. The transportation vehicle, e.g., is a car, a truck, a bus, or any other transportation vehicle. In particular, the transportation vehicle may be an autonomously or at least partially autonomously driving/moving vehicle. The mobile communications services, e.g., comprise or correspond to functions and/or applications of the transportation vehicle. In autonomously or partially autonomously driving vehicles, the mobile communications services particularly relate to mobile communications services for autonomous or assisted driving like mobile communications services for tele-operated driving (ToD), high definition (HD) mapping, anticipated cooperative collision avoidance (ACCA) and/or platooning. The skilled person having benefit from the present disclosure will appreciate that the proposed concept and method 100 can be also applied to other mobile communications services like, e.g., mobile data communication services and/or data streaming services (e.g., for entertainment).

The mobile communications systems, e.g., correspond to or comprise different mobile communication networks which, e.g., are operated by different mobile network operators (MNOs). To have access to multiple mobile communications systems, the network node or the transportation vehicle may thus have multiple different subscriber identity modules (SIMs) or SIM cards. Accordingly, the multiple mobile communications systems may particularly correspond to a plurality of mobile communications systems available for the transportation vehicle or the network node.

Different mobile communications services may have different requirements for a QoS of the mobile communications systems. In particular, different mobile communications services may have different requirements for one or more criteria of the QoS. In particular, the one or more criteria may comprise criteria which affect a functionality of one or more of the mobile communications services. The criteria, e.g., comprise a data rate and/or a communication latency. A mobile communications service for ToD, e.g., has other requirements for the data rate and the communication latency than a mobile communications service for ACCA. Thus, the information on the rQoS may be indicative of different requirements for the QoS. In particular, the rQoS may be indicative of future requirements. It is noted that the QoS may be also affected by other criteria which are not mentioned herein. Accordingly, the information on the rQoS may additionally or alternatively be indicative of further and/or other criteria for the QoS.

Further method 100 comprises determining 120 for each of multiple mobile communications systems information on a predicted quality of service (pQoS). The pQoS may be also understood as an estimation of a future QoS or an estimated interval/range for the future QoS. The skilled person will appreciate that, e.g., information on previously determined or measured QoS, various prediction models using machine learning (e.g., extreme learning machines), and different feature selection techniques (e.g., Principal Component Analysis, PCA, and/or Rough Set Analysis, RSA) can be used for determining 120 the pQoS. In particular, the information on the pQoS may be indicative of one or more future values of one or more criteria of the QoS which affect a functionality of one or more of the mobile communications services. In particular, those criteria may at least partly correspond to criteria of the information on the rQoS to provide comparability of the information on the pQoS and the rQoS. The criteria, e.g., are a (maximum) data rate and/or a communication latency. It is understood that the information may additionally or alternatively may be indicative of one or more further or other criteria of the QoS.

Also, method 100 comprises selecting 130 from the multiple mobile communications systems a mobile communications system for each of multiple mobile communications services based on the information on the rQoS and the pQoS of the mobile communications system. The mobile communications system, e.g., is selected such that the pQoS the mobile communications system satisfies the rQoS of a respective mobile communications service, e.g., to provide a desired functionality of the mobile communications service. A mobile communications service for ToD, e.g., may require a distinct rQoS, and in particular, a distinct data rate and communication latency for functionality. Mobile communications services for ToD, for instance, have a predefined rQoS to allow that environmental data (e.g., video data) and instructions are communicated between the transportation vehicle and a remote control center with at least a certain minimum data rate and a certain maximum communication latency to enable the remote control center to safely maneuver the transportation vehicle from remote. Hence, a mobile communications system may be selected such that the pQoS of the selected mobile communications system satisfies the rQoS of the mobile communications service for ToD. The skilled person will appreciate that the same principle described with regard to the mobile communications service for ToD applies to the mobile communications service for ACCA, e.g., to enable the transportation vehicle to anticipate imminent traffic events (e.g., a traffic jam, an imminent obstruction) or situations sufficiently early, e.g., in sufficient time, also referred to as "ACCA prediction horizon", before the transportation vehicle encounters such traffic events or situation. Also, this principle applies to the mobile communications service for HD mapping, e.g., for providing a sufficient attainable map accuracy and/or map update rate, to the mobile communications service for platooning, e.g., to allow a fuel-efficient coordination of transportation vehicles in the platoon of transportation vehicles, and to other mobile communications services (e.g., data streaming services).

The skilled person having benefit from the present disclosure will appreciate that method 100 may be executed iteratively, e.g., to iteratively select proper mobile communications system/s for the mobile communications services.

Further, the respective mobile communications system for a respective mobile communications service may be selected with respect to a utility of the mobile communications service at a pQoS of the respective mobile communications system. To do so, method 100 may further comprise obtaining, for the mobile communications systems, information on a utility of multiple mobile communications services for/at the pQoS of a respective mobile communications system. Also, selecting 130 the mobile communications system may comprise selecting the mobile communications system further based on the information on the utility. The utility can be also understood as a measure for the functionality (e.g., a measure for how "good" the mobile communications service or a related application like ToD, ACCA, HD mapping, platooning, etc. works) or as a benefit from the mobile communications service. Accordingly, the mobile system whose pQoS provides a desired or ideally the best utility among the available mobile communications systems may be selected for at least one or for each of the multiple mobile communications services. For the mobile communications service for ToD, e.g., a maximum allowable velocity of a remotely controlled transportation vehicle in the mobile communications service for ToD is indicative of the utility. Accordingly, a mobile communications system whose pQoS provides a desired or the highest maximum allowable velocity (e.g., at least 100 km/h) may be selected. The skilled person having benefit from the present disclosure will understand that the data rate and/or the communication latency may affect the utility, e.g., maximum allowable velocity, the ACCA prediction horizon, the attainable map accuracy, map update rate, the highest allowable velocity, the lowest minimum allowable distance, and/or the best fuel efficiency. The mobile communications system providing the highest maximum allowable velocity, e.g., is the one providing the pQoS indicative of the highest predicted data rate and/or the lowest latency among the multiple (available) mobile communications systems. According to the same principle, the mobile communications system may be selected for one or more of the mobile communications services for HD mapping, ACCA, and platooning. Thus, e.g., a desired or the best attainable map accuracy and/or the highest attainable map update rate in the mobile communications service for HD mapping may be provided, a desired or the largest ACCA prediction horizon in the mobile communications service for ACCA, and/or a desired or the lowest minimum allowable distance between transportation vehicles in the platoon and, thus, a desired or the best fuel efficiency of the platoon in the mobile communications service for platooning is provided.

In particular, for at least two of the mobile communications services different mobile communications systems may be selected, e.g., due to different rQoS of the mobile communications services and/different rQoS of the mobile communications systems and/or for exploiting the different mobile communications systems to provide desired or the best utilities, as described in more detail above. E.g., although the pQoS of one of the mobile communications system may satisfy the rQoS and provide the functionality of the two or more mobile communications services, different mobile communications systems may be selected for the mobile communications services to also provide a desired or the best functionality of the two or more mobile communications services.

Since, one or more of the mobile communications systems may provide various radio access technologies (RATs), obtaining 110 from multiple mobile communications systems the information on the pQoS may comprise obtaining for the mobile communications systems information on a pQoS of one or more RATs of a respective mobile communications system. One or more of the mobile communications systems, e.g., comprise multiple different RATs, e.g., in accordance with different communication standards and/or technologies (e.g., BLUETOOTH®, Wi-Fi, Global System for Mobile Communications, GSM, Universal Mobile Telecommunications System, UMTS, Long-Term Evolution, LTE, 5th generation, 5G, technology standard, etc.). The different RATs may provide different pQoS. Therefore, selecting the mobile communications system may further comprise selecting a RAT of the mobile communications system based on the information on the pQoS of the RATs, e.g., to provide functionality and/or a desired or the best utility of the mobile communications services in accordance with the above mentioned principles.

Method 100 may further comprise obtaining, for the multiple mobile communications systems, a confidence of a respective pQoS. The confidence, e.g., is indicative of a probability that the pQoS corresponds to a true/actual future QoS or of an interval (e.g., a confidence interval) in which the true/actual future QoS is with a predetermined probability. It is noted that the confidence optionally is specified differently. Accordingly, selecting 130 the mobile communications system may comprise selecting the mobile communications system for one or each of multiple mobile communications services based on the confidence. This, e.g., may provide that the rQoS of the one or each of the multiple mobile communications services is satisfied by the true/actual future QoS of the selected mobile communications system/s with a desired probability/confidence. The skilled person will appreciate that, e.g., due to different desired safety levels, the mobile communications services may demand a different confidence of the pQoS and, thus, one or more mobile communications systems may be selected for one or more of the mobile communications services (inter alia) based on the confidence of the respective pQoS. E.g., the higher a safety level of a mobile communications service, the higher may be a required confidence of the pQoS to provide a higher probability that the mobile communications service functions properly.

Method 100 may further comprise adjusting the rQoS of one or more mobile communications services based on the information on the pQoS by adjusting a functional setting of the one or more of the mobile communications services. In this way, the rQoS of one or more mobile communications services may be lowered while maintaining a desired functionality to enable one or more of the mobile communications systems to meet the lowered rQoS. E.g., a data size of data to be communicated in one or more mobile communications services may be lowered for a lower rQoS. E.g., the frame rate can be reduced for video data to be communicated in one or more mobile communications services. Also, the settings may be adjusted with an increase in the rQoS to better exploit the selected mobile communications system. E.g., a required data rate and/or required communication latency of one or more mobile communications services may be adapted accordingly to better exploit the available pQoS of the selected mobile communications system/s.

Method 100 may further comprise determining a QoS prediction horizon for the pQoS with respect to a velocity of the transportation vehicle, a traffic situation around the transportation vehicle, and/or an adaption capability of the rQoS of one or more of the mobile communications services, and wherein determining from the multiple mobile communications systems the pQoS comprises determining for each of multiple mobile communications systems the pQoS for the QoS prediction horizon. The QoS prediction horizon can be understood as a measure that indicates at or up to what time in the future the QoS is predicted. The prediction horizon, e.g., depends on the velocity, the traffic situation, and/or the adaption capability. Higher velocities and a more dangerous or time-critical traffic situation (e.g., due to a higher traffic density around the transportation vehicle), e.g., demand an earlier adaption of the selected mobile communications system for a respective mobile communications service, e.g., due to a worsening of its QoS, by selecting another mobile communications service according to method 100. Thus, the prediction horizon may be raised in response to a higher velocity or another traffic situation and, thus, e.g., a proper mobile communications system may be selected in accordance with method 100 and sufficiently early to maintain the functionality and/or utility of the mobile communications services.

The adaption capability, e.g., is a measure indicating in which extent the rQoS of one or more mobile communications services is variable, e.g., by adjusting the functional setting/s, while the functionality of the mobile communications services is maintained. In mobile communications services where video data is to be communicated via one of the mobile communications systems, e.g., in the mobile communications service for ToD, the adaption capability, may be indicative of range in which a frame rate of the video data can be adapted while the functionality of the mobile communications service is still maintained. E.g. the functional settings may be adapted within the adaption capability to lower the rQoS to cause the QoS of a mobile communications system used for a respective mobile communications service to satisfy the lowered rQoS and to avoid changing the mobile communications system for this mobile communications service when the QoS falls short of the respective rQoS. The less the adaption capability, e.g., the narrower this range, the larger may be the determined QoS prediction horizon to lower a frequency at which the mobile communications system for one or more mobile communications services is changed/switched, e.g., when method 100 is executed iteratively, as described above.

Also, the mobile communications system may be selected with respect to the costs of the mobile communications system for a respective mobile communications service, as described above.

Method 100 may be executed by a suitable apparatus for a network node or a transportation vehicle.

Figure 2:
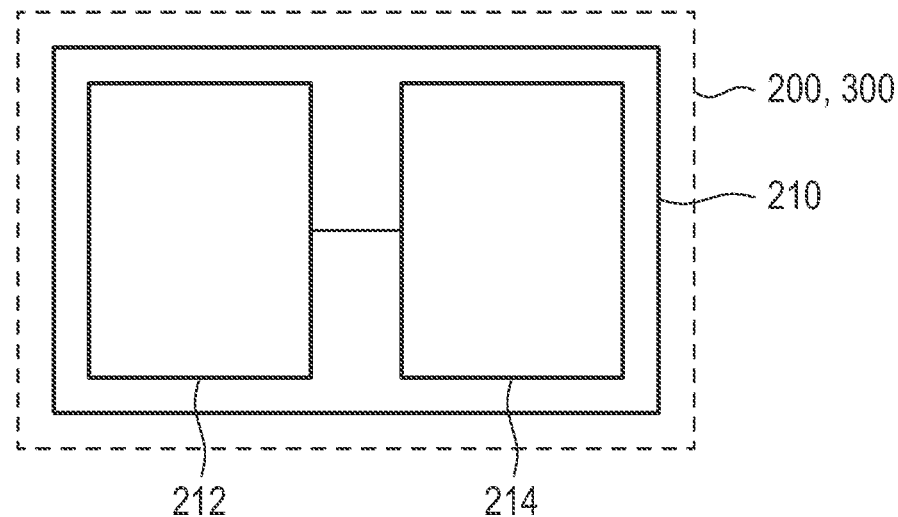
FIG. 2 illustrates a block diagram schematically illustrating an exemplary embodiment of an apparatus for selecting mobile communications systems for multiple mobile communications services of a transportation vehicle.

FIG. 2 illustrates a block diagram schematically illustrating an exemplary embodiment of an apparatus 210 for a network node and for selecting mobile communications systems for multiple mobile communications services of a transportation vehicle.

The apparatus 210 comprises one or more interfaces 212 configured to communicate in a communication network and a data processing circuit 214 configured to control the one or more interfaces 212. The data processing circuit 214 is further configured to execute one of the proposed methods, e.g., method 100.

As indicated by dashed lines in FIG. 2, the apparatus 210 may optionally be installed on a transportation vehicle 300 for selecting mobile communications systems for multiple mobile communications services of the transportation vehicle 300. Also, the apparatus 210 may be installed in a network node 200 for selecting mobile communications systems for multiple mobile communications services of a vehicle remote from the transportation vehicle by the network node, e.g., to save processing resources of the transportation vehicle. The network node 200, e.g., may select the mobile communications systems for the mobile communications services according to method 100 and communicate the selected mobile communications systems to the transportation vehicle which then may use the selected mobile communications systems for the mobile communications services.

In disclosed embodiments, the one or more interfaces 212 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise further components to enable according communication with the transportation vehicle and/or infrastructure object and/or traffic entities. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may serve the purpose of accessing the mobile communications systems or their respective mobile communication networks and/or of obtaining for each of multiple mobile communications services information on a rQoS of the mobile communications services (e.g., in the manner described above in connection with method 100). Therefore, the one or more interfaces 212 may also comprise one or more SIMs.

As shown in FIG. 2 the respective one or more interfaces 212 are coupled to the data processing circuit 214 of the apparatus 210. In disclosed embodiments the communication circuit 214 may be implemented using one or more processing units, one or more processing devices, any method or mechanism for processing, such as a processor, a computer or a programmable hardware component being operable with accordingly adapted software. In other words, the described functions of the data processing circuit 214 may as well be implemented in software, which is then executed on one or more programmable hardware components. Such hardware components may comprise a general-purpose processor, a Digital Signal Processor (DSP), a micro-controller, or the like.

The data processing circuit 214, e.g., is configured to obtain for each of multiple mobile communications services information on the rQoS via the one or more interfaces 212, to determine the information on the pQoS, and to select the mobile communications system for each of multiple mobile communications services based on the information on the rQoS and the pQoS in the manner of method 100.

Figure 3:
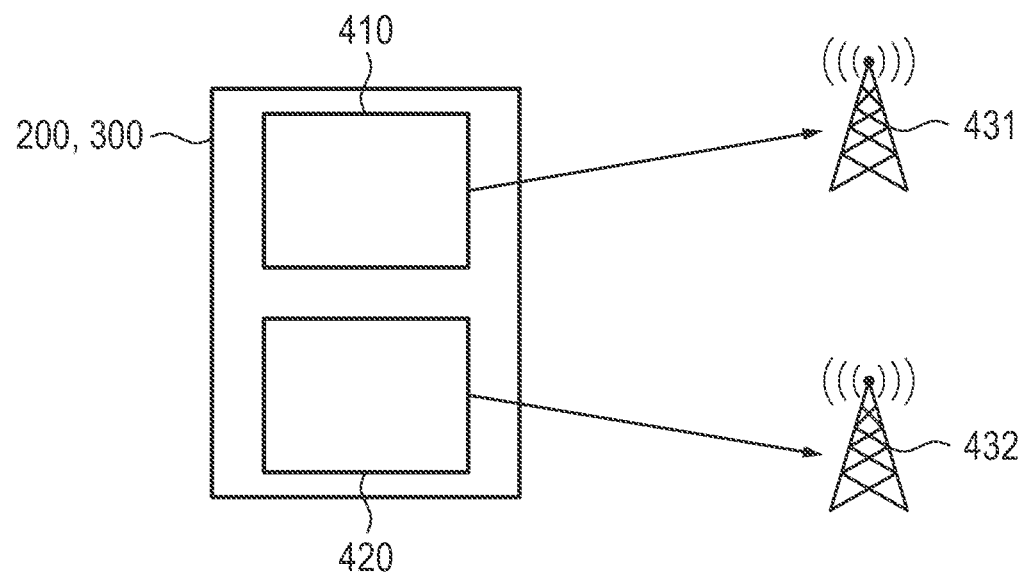
FIG. 3 illustrates a block diagram schematically illustrating an application of the disclosed concept.

FIG. 3 illustrates a block diagram schematically illustrating an application of the proposed concept.

In this application, the network node 200 or the transportation vehicle 300 may select for a first mobile communications service 410 and a second mobile communications service 420 a respective mobile communications system. As can be seen from FIG. 3, e.g., a first mobile communications system 431 and a second mobile communications system 432 are available to be used for the mobile communications services 410 and 420. The first mobile communications service, e.g., is a mobile communications service for ToD and the second mobile communications service 420, e.g., is a mobile communications service for ACCA. The skilled person will appreciate that the mobile communications services 410 and 420 can also comprise or correspond to other mobile communications services and that the following explanation also applies to other mobile communications services. The first and the second mobile communications system 431 and 432, e.g., comprise or correspond to different mobile communication networks which may be operated by different MNOs.

In accordance with the proposed concept, the network node 200 or the transportation vehicle 300 may receive a pQoS of the mobile communications systems 431 and 432 and/or of their different RATs, information on a confidence of the pQoS (e.g., a confidence interval), and (expected/estimated) costs for the use of the mobile communications systems 431 and 432 for the mobile communications services 410 and 420. Also, the network node 200/the transportation vehicle 300 may obtain/determine the rQoS of the mobile communications services 410 and 420 and a required confidence for the mobile communications services 410 and 420. Due to different technical and/or application specific demands and different risk levels of ToD and ACCA, the mobile communications services 410 and 420 may have a different rQoS and a different required confidence. The mobile communications service 410 for ToD may, e.g., require a larger maximum data rate and a lower communication latency and, thus, a higher/better pQoS than the mobile communications service 420 for ACCA. Also, the mobile communications services 410 and 420 may require different confidences for the pQoS of a respective selected mobile communications system.

The transportation vehicle may then plan in accordance with method 100 the assignment of the mobile communications services 410 and 420 and/or its messages to be communicated in the mobile communications services 410 and 420 to the mobile communications systems 431 and 432 depending on their rQoS, the pQoS, the confidence, and the costs.

E.g., the mobile communications systems 431 and 432 are selected or assigned to the mobile communications services 410 and 420 such that the pQoS and the confidence of the selected mobile communications system at least satisfies the rQoS and the required confidence of a respective mobile communications service. Unlike mobile communications system 432, mobile communications system 431 may satisfy both the rQoS (e.g., the required data rate and communication latency) and the required confidence of the mobile communications service 410. Therefore, mobile communications system 431 may be selected for mobile communications service 410.

Due to a lower rQoS of mobile communications service 420 compared to mobile communications service 410, both mobile communications systems 431 and 432 may satisfy the required confidence and the rQoS of mobile communications service 420. In this case, the mobile communications service causing the lowest costs and/or providing the best utility (e.g., the largest ACCA prediction horizon) of the mobile communications service 420 may be selected. Thus, e.g., mobile communications system 432 may be selected for mobile communications service 420.

It is noted that the mobile communications system may be also selected in other ways, e.g., according to another scheme and based on one, some or all of the aforementioned criteria (confidence, rQoS, pQoS, costs, and utility). In particular, in some schemes, the criteria may have a differently weighted impact on the selection of the mobile communications system/s for the mobile communications services. For example, the utility may have a greater impact than the costs or vice versa.

Further, the network node 200/transportation vehicle 300 may determine/plan future functional settings of one or both of the mobile communications services 410 and 420 depending on the pQoS and the costs, e.g., to enable the mobile communications system 431 and 432 exhibiting a lower pQoS but also causing less costs, to be used for one of the mobile communications services 410 and 420. E.g., thus, the rQoS of the mobile communications service 410 may be lowered by adjusting functional settings of the mobile communications service 410 to enable the mobile communications system 432 to satisfy the lowered rQoS. Consequently, if the mobile communications system 432 is less expensive than mobile communications system 431, the mobile communications system 432 may be selected for the mobile communications service 410 to save costs.

The skilled person having benefit from the present disclosure will appreciate that the above described concept also applies to other mobile communications services, another number of mobile communications services and mobile communications systems.

Ideally, method 100 allows to optimize the utility of the mobile communications services 410 and to minimize the costs. In the example of FIG. 3, e.g., the maximum allowable velocity of the remotely controlled vehicle using the mobile communications service 410 and the ACCA prediction horizon for ACCA using the mobile communications service 420 may be enlarged or ideally maximized.

The information on the pQoS, e.g., is provided and/or received iteratively. Accordingly, the concept or method 100 may be executed iteratively, e.g., each time when further information on the pQoS is provided and/or received/obtained.

In a disclosed embodiment of the proposed concept, the following actions are executed:
  Estimating the rQoS of the multiple mobile communications services (or "applications") and their required confidences;
  Obtaining information on the pQoS values together with confidence intervals for the multiple mobile communications systems;
  Establishing a plan indicating respective selected mobile communications systems for the mobile communications services and maximizing the utilities by allocating the mobile communications services to different mobile communications systems and, thus, different mobile communication networks of different MNOs by matching the rQoS and required confidence of each of the mobile communications services to the pQoS and confidence interval of the mobile communications systems;
  Applying the plan;
  Adapting the plan according to new information on the pQoS.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective actions of these methods.

LIST OF REFERENCE SIGNS

100 Method for selecting mobile communications systems for multiple mobile communications services of a transportation vehicle
110 obtaining a required quality of service
120 determining a predicted quality of service
130 selecting a mobile communications system
200 network node
210 apparatus
212 one or more interfaces
214 data processing circuit
300 transportation vehicle
410 first mobile communications service
420 second mobile communications service
431 first mobile communications system
432 second mobile communications system

The invention claimed is:

1. An apparatus, comprising:
one or more interfaces for communication; and
a data processing circuit to control the one or more interfaces, wherein the data processing circuit is further configured to select mobile communications systems for multiple mobile communications services of a transportation vehicle by obtaining, for each of the multiple mobile communications services, information on a required quality of service (rQoS) of the mobile communications services, determine, for each of the multiple mobile communications systems, information on a predicted quality of service (pQoS), and select, from the multiple mobile communications systems, a mobile communications system for each of multiple mobile communications services based on the information on the rQoS and the pQoS of the mobile communications system.

2. A network node comprising the apparatus of claim 1.

3. A transportation vehicle comprising the apparatus of claim 1.

4. The apparatus of claim 1, wherein the data processing circuit is further configured to obtain, for the mobile communications systems, information on a utility of the multiple mobile communications services for the pQoS of a respective mobile communications system, wherein the selection of the mobile communications system is based on the information on the utility.

5. The apparatus of claim 1, wherein the multiple mobile communications services comprise a mobile communications service for tele-operated driving (ToD) high definition (HD) mapping, anticipated cooperative collision avoidance (ACCA) and/or a mobile communications service for controlling a transportation vehicle in a platoon of transportation vehicles.

6. The apparatus of claim 5, wherein the information on the utility comprises information indicating a maximum allowable velocity of a remotely controlled transportation vehicle in the mobile communications service for ToD, on an attainable map update rate and/or map accuracy in the mobile communications service for HD mapping, on an attainable ACCA prediction horizon in the mobile communications service for ACCA, and/or on a minimum allowable distance of the transportation vehicle to other transportation vehicles in the platoon in the mobile communications service for controlling the transportation vehicle in the platoon, and wherein the selection of the mobile communications system for the mobile communications service for ToD is based on the information on the maximum allowable velocity, for the HD mapping is based on the attainable map update rate and/or map accuracy, for ACCA is based on the attainable ACCA prediction horizon, and/or for the mobile communications service for controlling the transportation vehicle in the platoon is based on the minimum allowable distance.

7. The apparatus of claim 1, wherein the obtaining from multiple mobile communications systems the information on the pQoS comprises obtaining for the mobile communications systems, information on a pQoS of one or more radio access technologies (RATs) of a respective mobile communications system, and wherein the selection of the mobile communications system selects a RAT of the mobile communications system based on the information on the pQoS of the RATs.

8. The apparatus of claim 1, wherein the data processing circuit is further configured to obtain, for the multiple mobile communications systems, a confidence of a respective pQoS, wherein the selection of the mobile communications system for each of the multiple mobile communications services is based on the confidence.

9. The apparatus of claim 1, wherein the data processing circuit is further configured to determine a QoS prediction horizon for the pQoS with respect to a velocity of the transportation vehicle, a traffic situation around the transportation vehicle, and/or an adaption capability of the rQoS one or more of the mobile communications services, and
wherein the determination, from the multiple mobile communications systems, of the pQoS comprises determination, for each of multiple mobile communications systems, the pQoS for the QoS prediction horizon.

10. The apparatus of claim 1, wherein the selection of the mobile communications system for each of multiple mobile communications services comprises selection, for at least two of the mobile communications services, different mobile communications systems.

11. The apparatus of claim 1, wherein the data processing circuit is further configured to adjust the rQoS of one or more mobile communications services based on the information on the pQoS by adjusting a functional setting of the one or more of the mobile communications services.

12. The apparatus of claim 1, wherein the data processing circuit is further configured to determine costs for multiple mobile communications systems for the mobile communication services, wherein the selection of the mobile communications system for the mobile communications service is based on the costs.

13. The apparatus of claim 1, wherein the data processing circuit is further configured to determine for each of multiple mobile communications systems further information on a predicted quality of service (pQoS) for the mobile communication service, wherein the selection of the mobile communications system for each of multiple mobile communications services is based on both the information the rQoS and the pQoS of the mobile communications system.

14. A method for selecting mobile communications systems for multiple mobile communications services of a transportation vehicle, the method comprising:
obtaining, for each of the multiple mobile communications services, information on a required quality of service (rQoS) of the mobile communications services;
determining, for each of the multiple mobile communications systems, information on a predicted quality of service (pQoS);

selecting, from the multiple mobile communications systems, a mobile communications system for each of multiple mobile communications services based on the information on the rQoS and the pQoS of the mobile communications system.

15. The method of claim 14, further comprising obtaining, for the mobile communications systems, information on a utility of the multiple mobile communications services for the pQoS of a respective mobile communications system,
wherein the selecting of the mobile communications system is based on the information on the utility.

16. The method of claim 14, wherein the multiple mobile communications services comprise a mobile communications service for tele-operated driving (ToD) high definition (HD) mapping, anticipated cooperative collision avoidance (ACCA) and/or a mobile communications service for controlling a transportation vehicle in a platoon of transportation vehicles.

17. The method of claim 16,
wherein the information on the utility comprises information indicating a maximum allowable velocity of a remotely controlled transportation vehicle in the mobile communications service for ToD, on an attainable map update rate and/or map accuracy in the mobile communications service for HD mapping, on an attainable ACCA prediction horizon in the mobile communications service for ACCA, and/or on a minimum allowable distance of the transportation vehicle to other transportation vehicles in the platoon in the mobile communications service for controlling the transportation vehicle in the platoon, and
wherein the selecting the mobile communications system for the mobile communications service for ToD is based on the information on the maximum allowable velocity, for the HD mapping is based on the attainable map update rate and/or map accuracy, for ACCA is based on the attainable ACCA prediction horizon, and/or for the mobile communications service for controlling the transportation vehicle in the platoon is based on the minimum allowable distance.

18. The method of claim 14,
wherein obtaining from multiple mobile communications systems the information on the pQoS comprises obtaining for the mobile communications systems, information on a pQoS of one or more radio access technologies (RATs) of a respective mobile communications system, and
wherein the selecting the mobile communications system selects a RAT of the mobile communications system based on the information on the pQoS of the RATs.

19. The method of claim 15, further comprising obtaining, for the multiple mobile communications systems, a confidence of a respective pQoS,
wherein the selecting the mobile communications system for each of the multiple mobile communications services is based on the confidence.

20. The method of claim 14, further comprising determining a QoS prediction horizon for the pQoS with respect to a velocity of the transportation vehicle, a traffic situation around the transportation vehicle, and/or an adaption capability of the rQoS one or more of the mobile communications services, and
wherein the determining, from the multiple mobile communications systems, of the pQoS comprises determining for each of multiple mobile communications systems the pQoS for the QoS prediction horizon.

21. The method of claim 14, wherein the selecting of the mobile communications system for each of multiple mobile communications services comprises selecting, for at least two of the mobile communications services, different mobile communications systems.

22. The method of claim 15, further comprising adjusting the rQoS of one or more mobile communications services based on the information on the pQoS by adjusting a functional setting of the one or more of the mobile communications services.

23. The method of claim 14, further comprising determining costs for multiple mobile communications systems for the mobile communication services,
wherein the selecting of the mobile communications system for the mobile communications service is based on the costs.

24. The method of claim 14, further comprising:
determining for each of multiple mobile communications systems further information on a predicted quality of service (pQoS) for the mobile communication service,
wherein the selecting of the mobile communications system for each of multiple mobile communications services is based on both the information the rQoS and the pQoS of the mobile communications system.

25. A non-transitory computer readable medium including a computer program having a program code for performing the method of claim 4, when the computer program is executed on a computer, a processor, or a programmable hardware component.

* * * * *